US012669002B2

(12) United States Patent
Peng et al.

(10) Patent No.: US 12,669,002 B2
(45) Date of Patent: Jun. 30, 2026

(54) HINGE DEVICE

(71) Applicant: Sinher Technology Inc., New Taipei (TW)

(72) Inventors: Chih-Huang Peng, New Taipei (TW); Chun-Fu Lin, New Taipei (TW); Nan-Hai Lai, New Taipei (TW)

(73) Assignee: SINHER TECHNOLOGY INC., New Taipei City (TW)

(*) Notice: Subject to any disclaimer, the term of this patent is extended or adjusted under 35 U.S.C. 154(b) by 0 days.

(21) Appl. No.: 18/970,058

(22) Filed: Dec. 5, 2024

(65) Prior Publication Data

US 2026/0160101 A1 Jun. 11, 2026

(51) Int. Cl.
*E05D 7/00* (2006.01)
*E05D 3/12* (2006.01)

(52) U.S. Cl.
CPC .......... *E05D 3/122* (2013.01); *E05Y 2201/71* (2013.01)

(58) Field of Classification Search
CPC .. E05D 3/12; E05D 3/122; E05D 3/06; E05D 3/10; E05D 11/082; E05D 11/087; E05D 2011/085; G06F 1/1681; G06F 1/1616; G06F 1/1618; G06F 1/168; E05Y 2900/606; E05Y 2900/602; E05Y 2201/71; E05Y 2201/718; H04M 1/0216; H04M 1/0222; H04M 1/022; H05K 5/0226; Y10T 16/547; Y10T 16/541
See application file for complete search history.

(56) References Cited

U.S. PATENT DOCUMENTS

| | | | | | |
|---|---|---|---|---|---|
| 9,464,471 | B1 * | 10/2016 | Chen | G06F 1/1681 | |
| 9,606,578 | B2 * | 3/2017 | Yuan | G06F 1/1616 | |
| 9,617,770 | B1 * | 4/2017 | Lin | E05D 11/082 | |
| 10,401,914 | B2 * | 9/2019 | Shang | E05D 5/04 | |
| 10,563,438 | B1 * | 2/2020 | Chen | E05D 5/10 | |
| 2012/0096678 | A1 * | 4/2012 | Zhang | G06F 1/1681 | 16/302 |
| 2014/0009874 | A1 * | 1/2014 | Huang | G06F 1/162 | 361/679.01 |
| 2015/0159413 | A1 * | 6/2015 | Chen | G06F 1/1681 | 16/342 |
| 2015/0342068 | A1 * | 11/2015 | Su | H04M 1/022 | 16/354 |

(Continued)

FOREIGN PATENT DOCUMENTS

| | | | | |
|---|---|---|---|---|
| CN | 210599835 U | * | 5/2020 | |
| CN | 211259338 U | * | 8/2020 | |
| WO | WO-2019147277 A1 | * | 8/2019 | G06F 1/1616 |

*Primary Examiner* — Chuck Y Mah
(74) *Attorney, Agent, or Firm* — MUNCY, GEISSLER, OLDS & LOWE, P.C.

(57) ABSTRACT

A hinge device including a base, a first shaft disposed on the base, a second bevel gear mounted on the base, and a second shaft arranged on the base and staggered with the first shaft. The first shaft includes a first bevel gear engaged with the second bevel gear, the second shaft is provided with a third bevel gear engaged with the second bevel gear a driving member selectively engaged with the third bevel gear, an elastic member connected to the driving member, and the elastic member is arranged to assist the driving member in engaging with the third bevel gear. The hinge device includes a first state and a second state.

9 Claims, 7 Drawing Sheets

(56) References Cited

U.S. PATENT DOCUMENTS

| | | | | |
|---|---|---|---|---|
| 2016/0032633 | A1* | 2/2016 | Hsu | E05D 3/122<br>16/368 |
| 2017/0235337 | A1* | 8/2017 | Vic | E05D 3/12<br>361/679.55 |
| 2018/0073613 | A1* | 3/2018 | Chen | F16H 25/18 |
| 2021/0096607 | A1* | 4/2021 | Hallar | G06F 1/1616 |
| 2022/0412138 | A1* | 12/2022 | Peng | E05D 3/122 |

* cited by examiner

20

HINGE DEVICE

FIELD OF THE INVENTION

The invention relates to a hinge device, particularly a hinge device that can be applied to curved screens.

BACKGROUND OF THE INVENTION

Currently, hinge devices are widely used in computer devices, commonly found in laptops, foldable displays, and other equipment.

These hinges are typically designed to provide screen flip functionality, allowing users to adjust the angle for different usage scenarios.

However, due to the design of traditional hinge mechanisms, which often employ two parallel pivot shafts, its rotation cannot achieve the curved screen effect required when the screen of a new-type laptop is unfolded. Therefore, there is a need to develop a hinge device that can adapt to curved screens to meet the demands of future laptops.

SUMMARY OF THE INVENTION

A main object of the invention is to improve the problem that conventional hinge devices cannot be effectively adapted to curved screens.

In order to achieve the above object, the invention provides a hinge device, including a base, a first shaft rotatably disposed on the base, a second bevel gear disposed on the base, and a second shaft rotatably disposed on the base and being orthogonal to the first shaft. The first shaft includes a first bevel gear, the second shaft is provided with a third bevel gear engaged with the second bevel gear, a driving member slidably disposed on the second shaft and operatively engaged or disengaged with the third bevel gear, an elastic member connected between the driving member and the base, and the elastic member assists the driving member in engaging with the third bevel gear. The hinge device includes a first state and a second state. In the first state, the first shaft rotates and drives the third bevel gear to rotate without engaging with the driving member, and the second shaft does not rotate along with the third bevel gear; in the second state, the third bevel gear engages with the driving member, and the first shaft and the second shaft rotate together. The hinge device switches between the first state and the second state during continuously rotation of the first shaft. The first shaft and the second shaft are configured to be connected to a first portion and a second portion of an electronic device, respectively. The first shaft rotates to change a first angle between the first portion and the second portion, and the second shaft rotates to change a second angle between a bottom side of the second portion and the central axis of the first axis In one embodiment, the third bevel gear includes a first connection structure, and the driving member comprises a second connection structure engageable with the first connection structure.

In one embodiment, the first connection structure includes a first recess, and the second connection structure comprises a first protrusion corresponding to the first recess, and an inner wall of the first recess is beveled.

In one embodiment, the second shaft comprises at least one first plane, the driving member comprises at least one second plane corresponding to the at least one first plane, a rotation of the driving member with respect to the second shaft is limited when the at least one first plane in contact with the at least one second plane.

In one embodiment, the base comprises a first shaft hole provided for configuration of the first shaft, and a second shaft hole provided for configuration of the second shaft, and an axis of the first shaft hole is located on a plane different from that of the second shaft hole.

In one embodiment, the driving member comprises a resisting block facing the base, and the base comprises a second recess positioned opposite the resisting block, with one side of the second recess forming a second protrusion.

In one embodiment, the first shaft comprises a first stopping block, and the base comprises a second stopping block corresponding to the first stopping block for limiting a movement range of the first shaft.

In one embodiment, the third bevel gear comprises a third stopping block, and the second shaft comprises a fourth stopping block corresponding to the third stopping block for limiting a movement range of the second shaft.

In one embodiment, the first shaft is provided with a first torque assembly, and the second shaft is provided with a second torque assembly. The first torque assembly and the second torque assembly are configured to determine rotational torques of the first shaft and the second shaft, respectively Through the aforementioned embodiments, the invention provides the following advantages compared to conventional technologies:

The hinge device of the invention, through the staggered arrangement of the first shaft and the second shaft, allows the second shaft to drive an electronic device to achieve a curved screen effect in a rotation direction different from that of the first shaft during the process of opening with the first shaft. On the other hand, after the hinge device is opened to a predetermined angle, the second shaft and the first shaft form a co-motion relationship, allowing the curved screen effect to gradually appear while opening the electronic device.

DETAILED DESCRIPTION OF THE PREFERRED EMBODIMENTS

Figure 1:
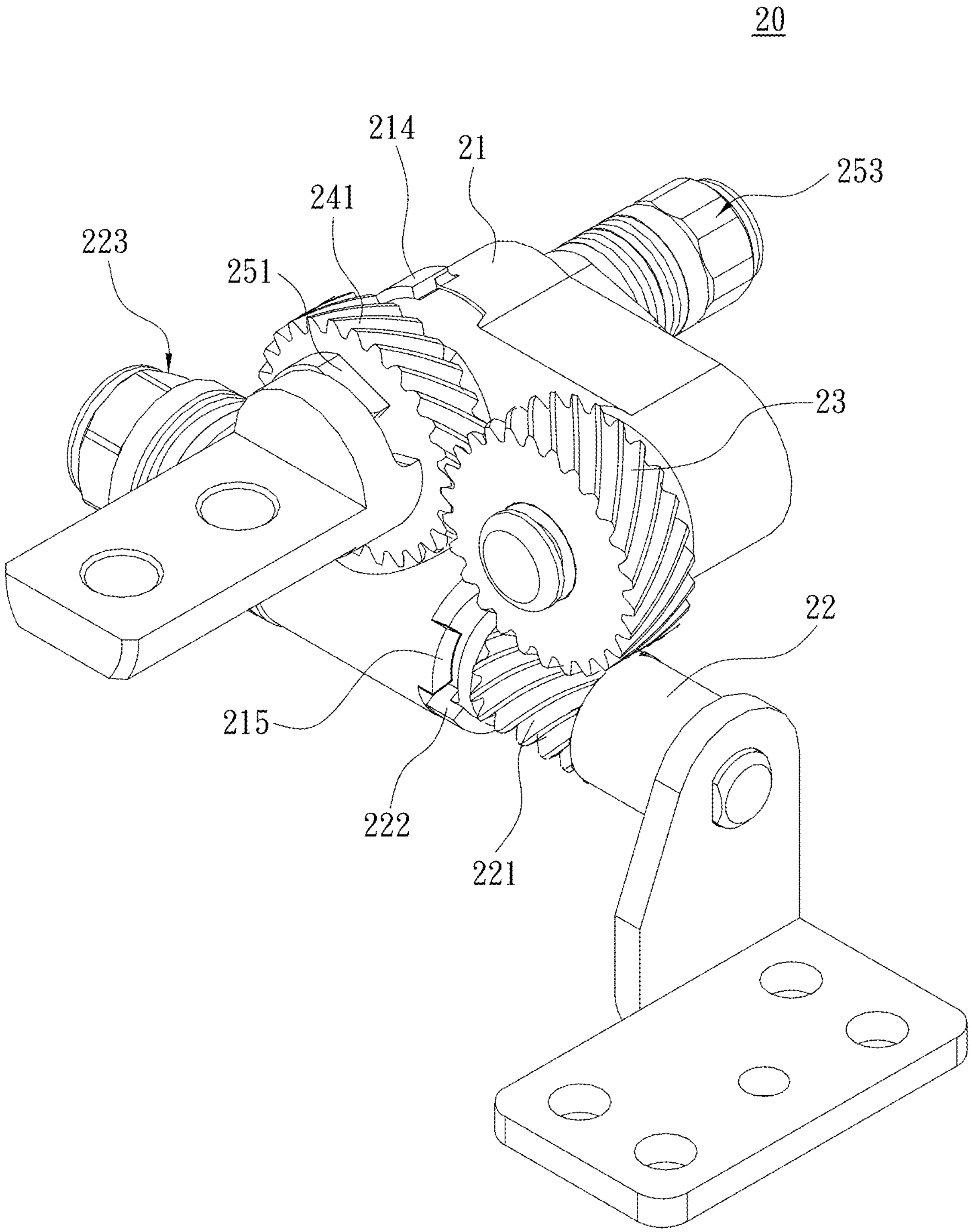
FIG. 1 is a schematic structural diagram of an embodiment of the invention.

Please refer to FIG. 1, FIG. 2, FIG. 3, FIG. 4, FIG. 5, FIG. 6, and FIG. 7. The invention provides a hinge device 20 applied to an electronic device 40. The electronic device 40 may be a laptop, a tablet, or a mobile phone, and is not limited to these examples in this embodiment. The hinge device 20 includes a base 21, a first shaft 22 disposed on the base 21, a second bevel gear 23 mounted on the base 21, and a second shaft 24 arranged on the base 21 and staggered with the first shaft 22. The base 21 serves as a support for the first shaft 22, the second bevel gear 23, and the second shaft 24. The first shaft 22 includes a first bevel gear 221 engaged with the second bevel gear 23 when the second bevel gear 23 is mounted on the base 21. It should be understood that the first bevel gear 221 may be either a structure formed on the first shaft 22 itself or an additional member fitted onto the first shaft 22. Furthermore, a spiral direction of teeth of the first bevel gear 221 is the same as that of the second bevel gear 23, so that the first bevel gear 221 and the second bevel gear 23 are arranged in a non-parallel and intersecting manner on the base 21 to achieve mutual engagement.

The second shaft 24 is provided with a third bevel gear 241 engaged with the second bevel gear 23, a driving member 242 selectively engaged with the third bevel gear 241, and an elastic member 243 connected to the driving member 242. The second bevel gear 23 and the third bevel gear 241 are arranged in parallel, and the third bevel gear 241 rotates under driving by the second bevel gear 23. A spiral direction of teeth of the second bevel gear 23 is opposite to that of the third bevel gear 241, allowing the second bevel gear 23 and the third bevel gear 241 to be engaged after assembling. Furthermore, when the first shaft 22 rotates, the second bevel gear 23 serves as an idler gear between the first bevel gear 221 and the third bevel gear 241. In other words, an arrangement of the second bevel gear 23 determines a relative rotational direction between the first bevel gear 221 and the third bevel gear 241.

The elastic member 243 is arranged to assist the driving member 242 in engaging with the third bevel gear 241. In other words, after the driving member 242 and the elastic member 243 are assembled, the elastic member 243 applies a force to the driving member 242 to move towards the third bevel gear 241. Furthermore, when the third bevel gear 241 rotates to a certain angle, the driving member 242 engages with the third bevel gear 241. Additionally, when the driving member 242 is arranged on the second shaft 24, it does not rotate relative to the second shaft 24. During the continued rotation of the third bevel gear 241, two states can be constituted between the third bevel gear 241 and the driving member 242 as follows: engaged or disengaged. When the third bevel gear 241 engages with the driving member 242, the third bevel gear 241 drives both the driving member 242 and the second shaft 24 to rotate; on the contrary, when the third bevel gear 241 disengages from the driving member 242, the third bevel gear 241 only rotates relative to the second shaft 24. In other words, when the driving member 242 is in a disengaged state with the third bevel gear 241, the rotation of the third bevel gear 241 will not drive the electronic device 40 to be flipped.

Further, the hinge device 20 includes a first state and a second state. In the first state, the first shaft 22 rotates and drives the third bevel gear 241, while the third bevel gear 241 does not engage with the driving member 242 and idles in place. At this time, the second shaft 24 does not rotate along with the third bevel gear 241. In the second state, the third bevel gear 241 engages with the driving member 242, and the first shaft 22 and the second shaft 24 rotate together. In other words, when the hinge device 20 is in the first state, the third bevel gear 241 is separated from the driving member 242, and the second shaft 24 does not rotate with the third bevel gear 241. In contrast, when the hinge device 20 enters the second state, the third bevel gear 241 engages with the driving member 242, and the second shaft 24 rotates along with the third bevel gear 241. Furthermore, the hinge device 20 switches between the first state and the second state during continuously rotation of the first shaft 22.

Figure 6:
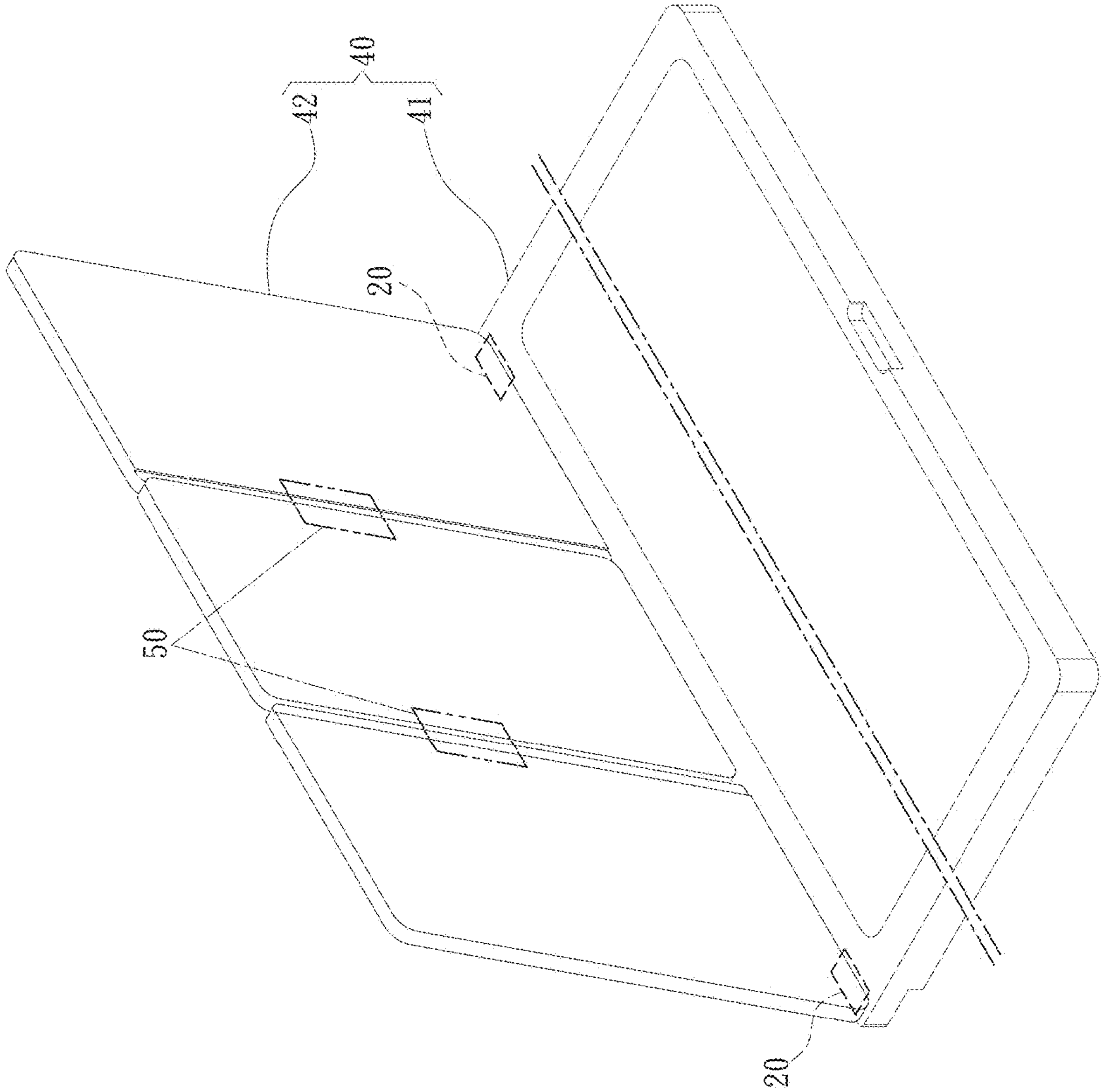
FIG. 6 is a schematic diagram of an embodiment of the invention combined with an electronic device (1).
Figure 7:
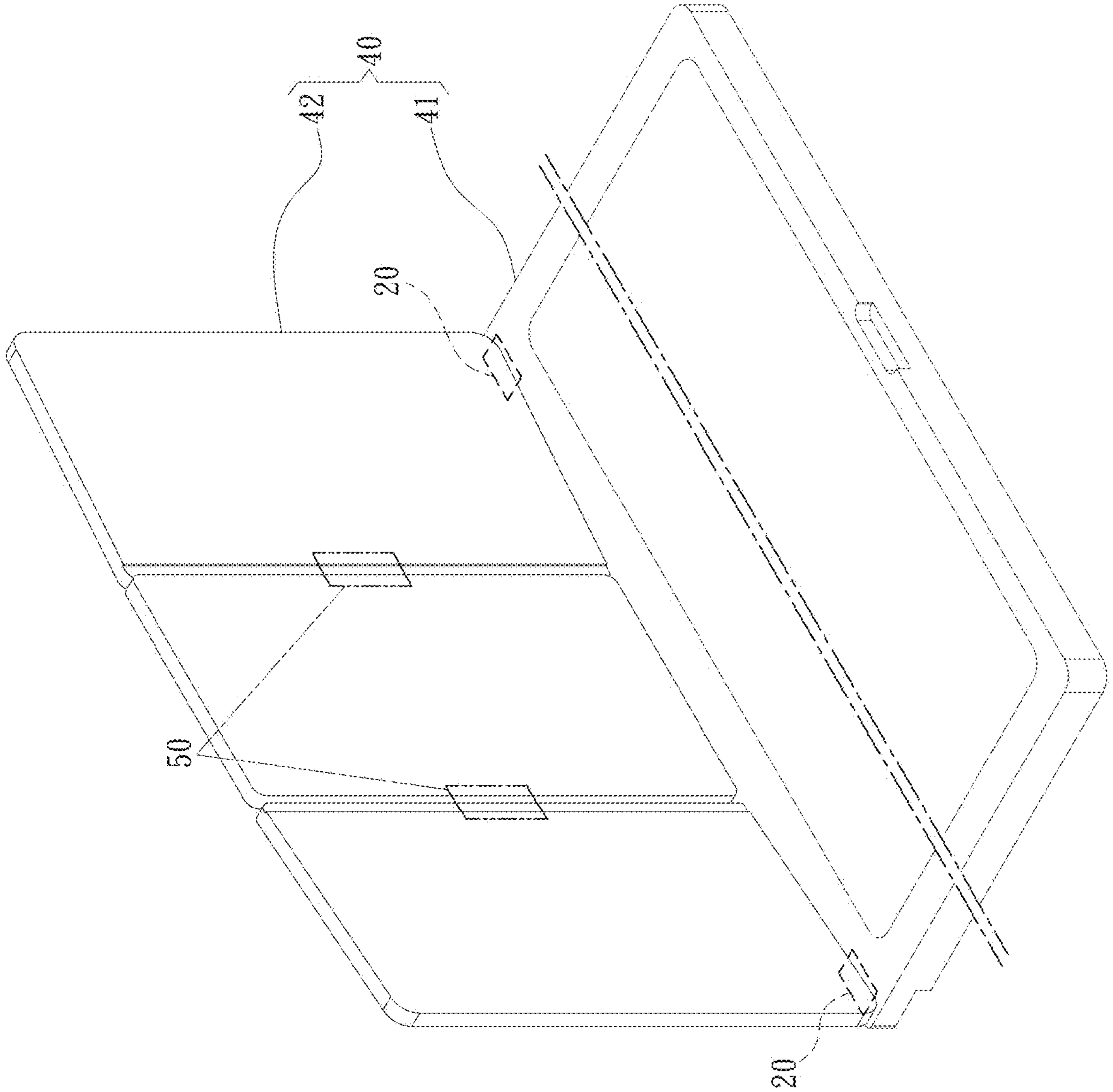
FIG. 7 is a schematic diagram of an embodiment of the invention combined with an electronic device (2).

As can be seen from the above, the hinge device 20 is configured with the first shaft 22 and the second shaft 24 intersecting. This allows the hinge device 20, during an opening process with the first shaft 22, to enable the second shaft 24 to rotate in a direction different from that of the first shaft 22, thereby driving the electronic device to achieve a curved screen effect. On the other hand, after the hinge device 20 opens to a predetermined angle, the second shaft 24 and the first shaft 22 form a co-motion relationship, causing the electronic device 40 to gradually appear the curved screen effect during the opening process. For example, the first shaft 22 of the hinge device 20 is connected to a first portion 41 of the electronic device 40, while the second shaft 24 is connected to a second portion 42 of the electronic device 40. When the hinge device 20 is folded, the first portion 41 and the second portion 42 are in contact with each other. In FIG. 6, the first shaft 22 continues to rotate while unfolding the electronic device 40, while the second shaft 24 drives the second portion 42 to rotate. In FIG. 7, after the electronic device 40 is opened to a predetermined angle, the second shaft 24 rotates along with the first shaft 22, and the second portion 42 of the electronic device 40 gradually forms the curved monitor effect through the rotation of the second shaft 24. It is worth noting that the second portion 42 is provided with at least one hinge 50, which assists in bending the second portion 42.

Figure 2:
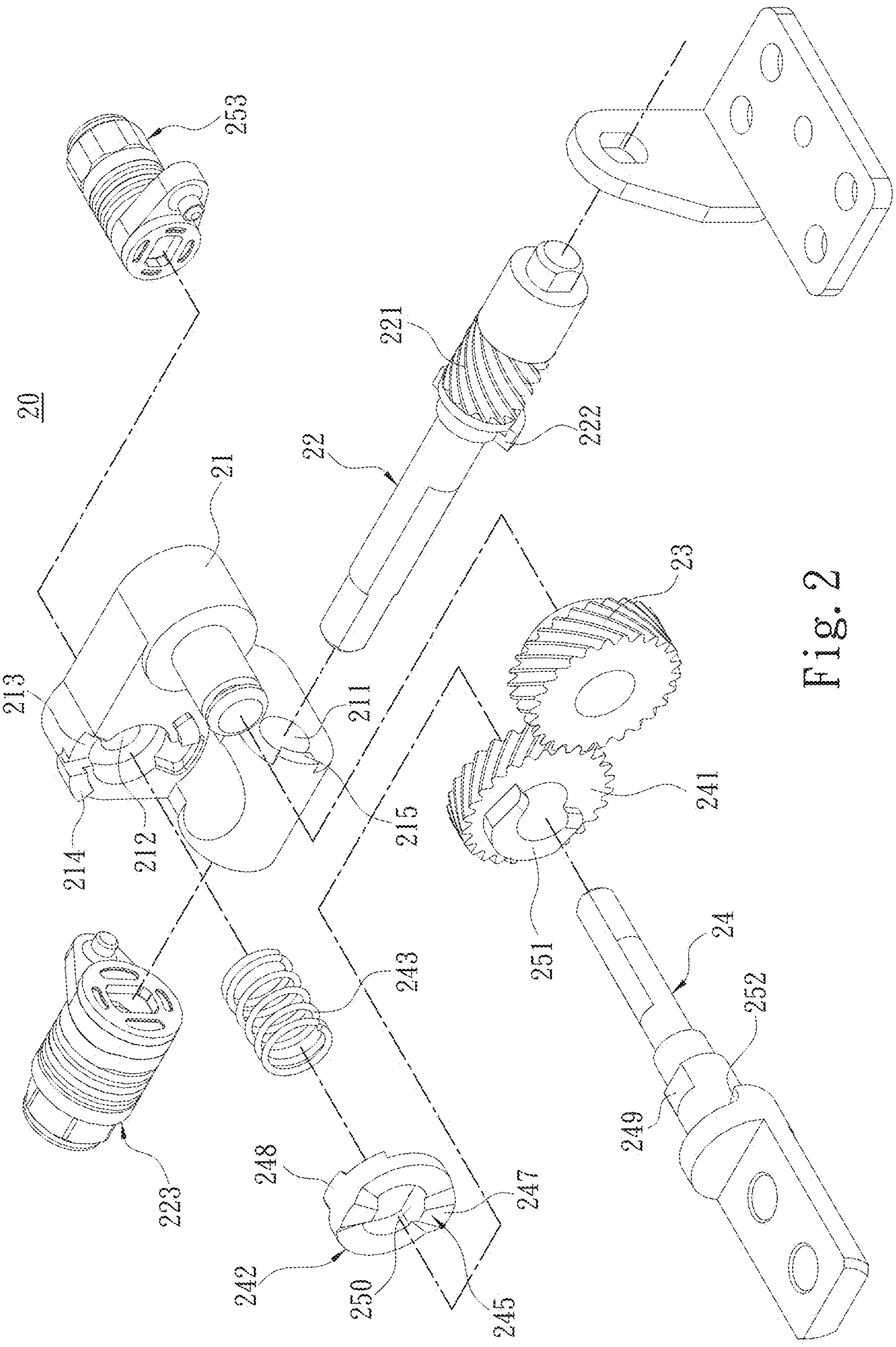
FIG. 2 is a schematic exploded view (1) of an embodiment of the invention.
Figure 3:
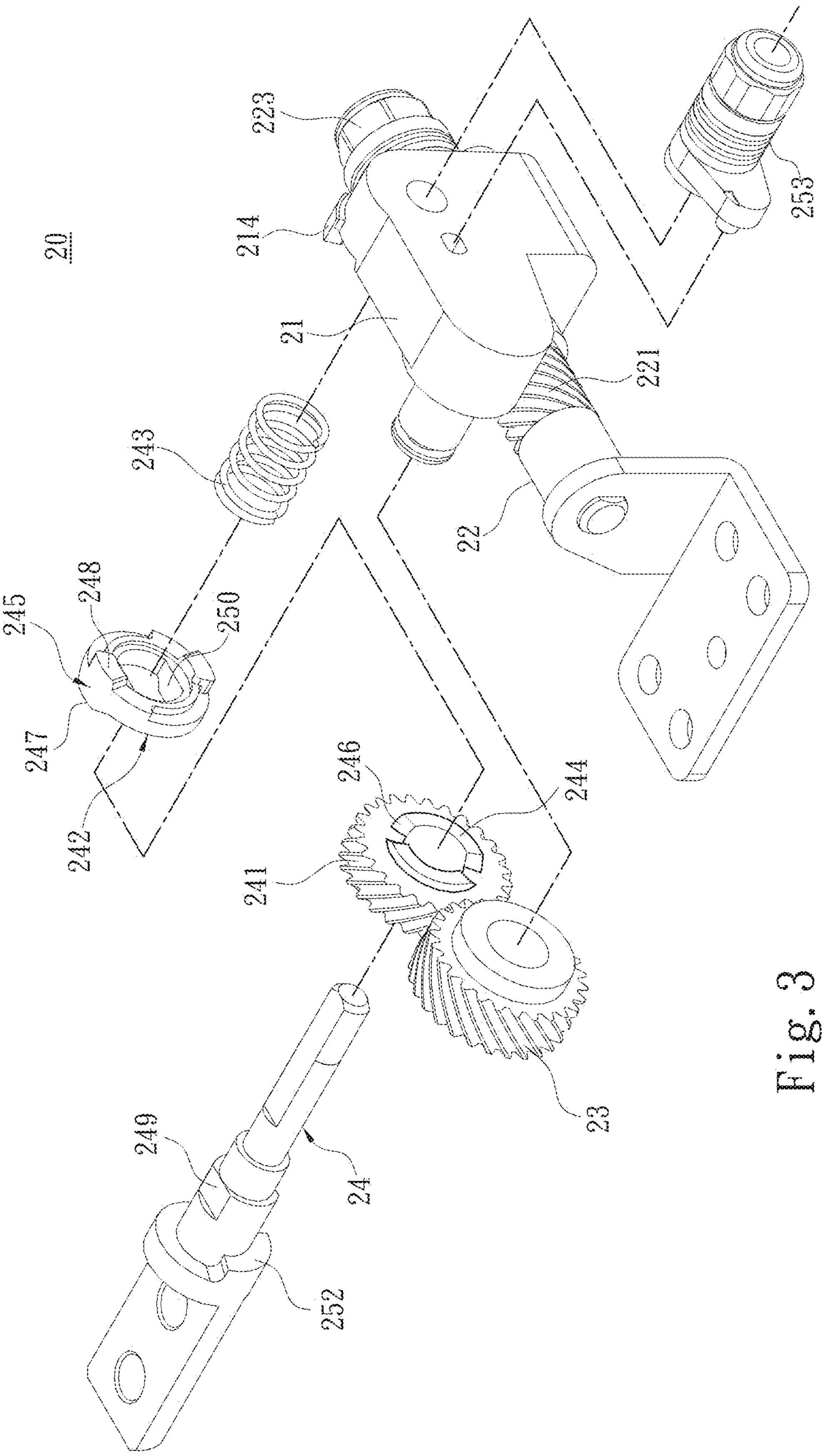
FIG. 3 is a schematic exploded view (2) of an embodiment of the invention.
Figure 4:
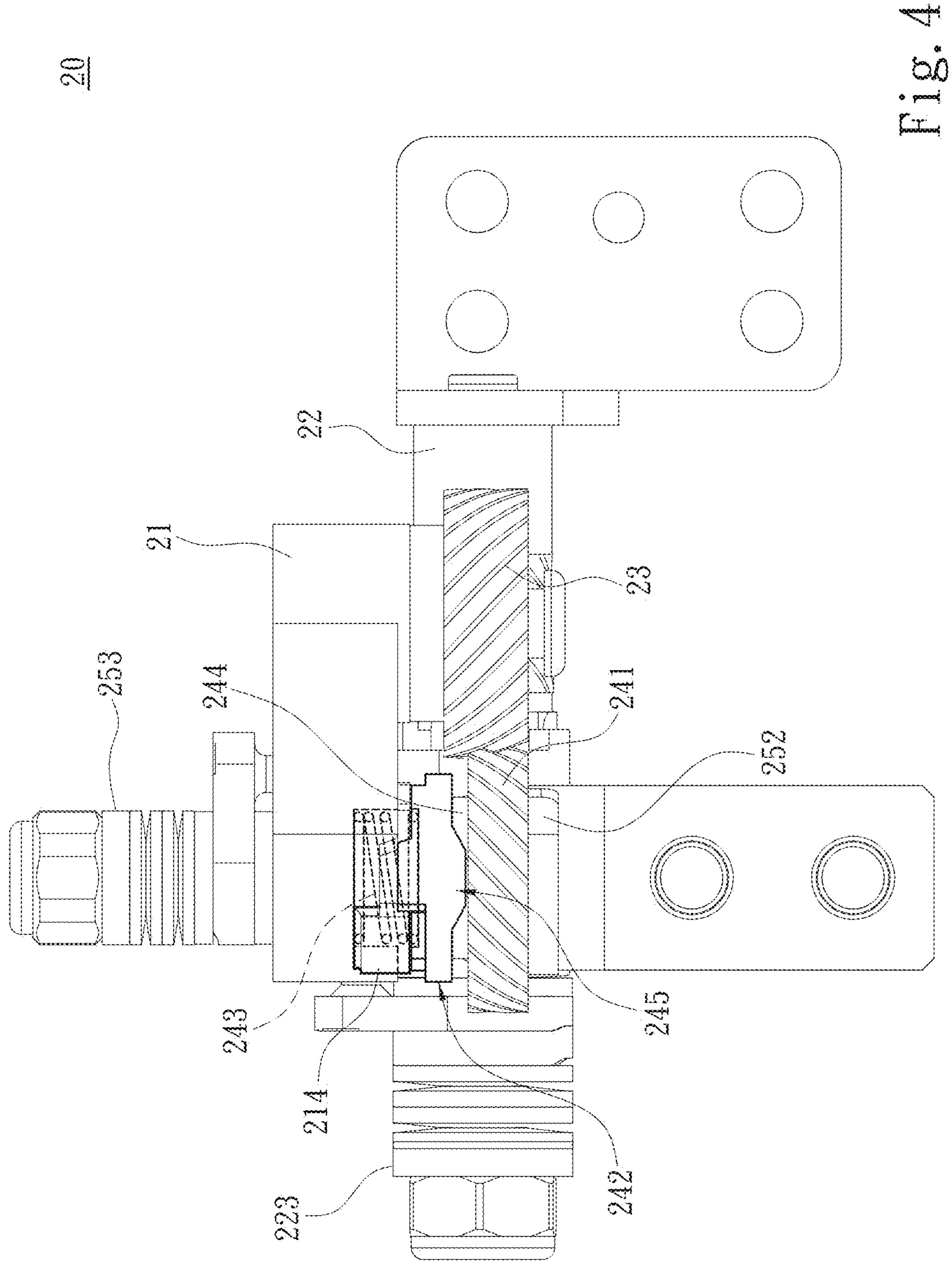
FIG. 4 is a schematic structural diagram of a first state of an embodiment of the invention.
Figure 5:
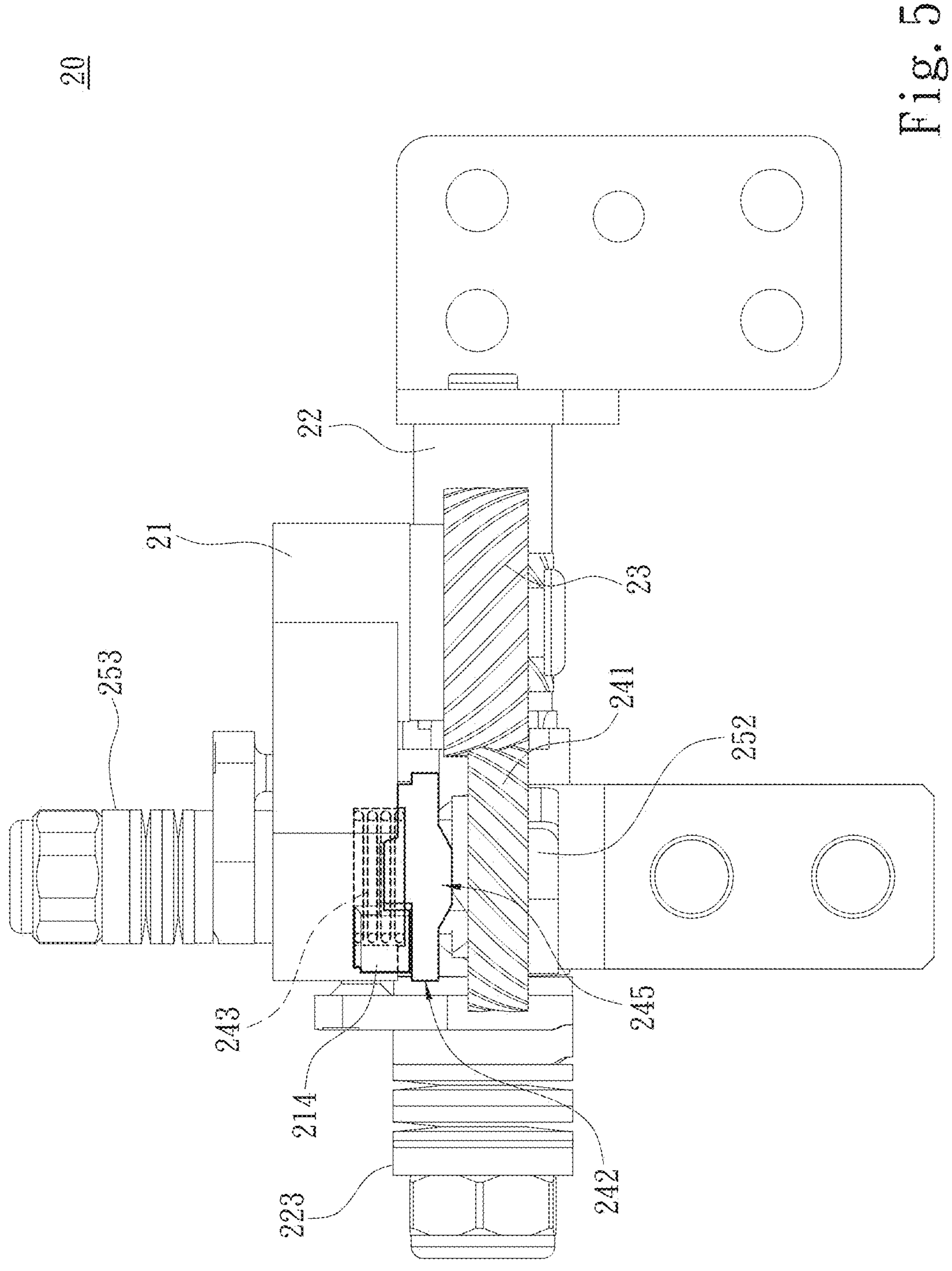
FIG. 5 is a schematic structural diagram of a second state of an embodiment of the invention.

Please refer to FIG. 2 and FIG. 3. In one embodiment, the third bevel gear 241 includes a first connection structure 244. The driving member 242 includes a second connection structure 245 corresponding to the first connection structure 244. As a result, when the third bevel gear 241 rotates, the third bevel gear 241 and the driving member 242 are synchronized in rotation through the interlocking of the first connection structure 244 and the second connection structure 245. In another embodiment, the first connection structure 244 includes a first recess 246, and the second connection structure 245 includes a first protrusion 247 corresponding to the first recess 246. When the third bevel gear 241 engages with the driving member 242, the first protrusion 247 engages with the first recess 246. The force generated when the third bevel gear 241 rotates is transmitted to the first protrusion 247 via the first recess 246, allowing the driving member 242 to rotate synchronously with the third bevel gear 241. Additionally, an inner wall of the first recess 246 is beveled. When the third bevel gear 241 is separated from the driving member 242, the inner wall of the first recess 246 pushes the first protrusion 247 to slide along the inner wall of the first recess 246 and separate from the first recess 246.

Please refer to FIG. 2 and FIG. 3. In one embodiment, the driving member 242 includes a resisting block 248 facing the base 21, and the base 21 includes a second recess 213 positioned opposite the resisting block 248, with one side of the second recess 213 forming a second protrusion 214. When the hinge device 20 is achieved to the second state, the third bevel gear 241 engages with the driving member 242, and the resisting block 248 separates the second recess 213 and presses against the base 21, preventing the driving member 242 from disengaging from the third bevel gear 241 under vibration.

Please refer to FIG. 2 and FIG. 3. In one embodiment, the second shaft 24 includes at least one first plane 249, and the driving member 242 includes at least one second plane 250 corresponding to the at least one first plane 249. When the driving member 242 is assembled onto the second shaft 24, the at least one second plane 250 of the driving member 242 slides along the at least one first plane 249 of the second shaft 24. Additionally, when the at least one first plane 249 is in contact with the at least one second plane 250, a rotation of the driving member 242 with respect to the second shaft 24 is limited.

Please refer to FIG. 1, FIG. 2, and FIG. 3. In one embodiment, the base 21 includes a first shaft hole 211 provided for configuration of the first shaft 22, and a second shaft hole 212 provided for configuration of the second shaft 24. An axis of the first shaft hole 211 is located on a plane different from that of the second shaft hole 212. In other words, when the first shaft 22 and the second shaft 24 are assembled onto the base 21, the first shaft 22 and the second shaft 24 are misaligned with each other, and a projection range of the first shaft 22 facing the second shaft 24 is in a staggered relationship with the second shaft 24.

Please refer to FIG. 1, FIG. 2, and FIG. 3. In one embodiment, the first shaft 22 includes a first stopping block 222, and the base 21 includes a second stopping block 215 corresponding to the first stopping block 222 for limiting a movement range of the first shaft 22, thereby limiting an opening angle of the hinge device 20. On the other hand, the third bevel gear 241 includes a third stopping block 251, and the second shaft 24 includes a fourth stopping block 252 corresponding to the third stopping block 251 for limiting a movement range of the second shaft 24, thereby restricting a rotational angle of the third bevel gear 241 relative to the driving member 242.

Please refer to FIG. 1, FIG. 2, FIG. 3, FIG. 4, and FIG. 5. In one embodiment, the first shaft 22 is provided with a first torque assembly 223, and the second shaft 24 is provided with a second torque assembly 253. Both the first torque assembly 223 and the second torque assembly 253 are each composed of a plurality of torque plates. The first torque assembly 223 determines a rotational torque of the first shaft 22, while the second torque assembly 253 determines a rotational torque of the second shaft 24.

What is claimed is:

1. A hinge device, comprising:

a base;

a first shaft, rotatably disposed on the base, and the first shaft comprising a first bevel gear;

a second bevel gear, rotatably disposed on the base and engaged with the first bevel gear; and a second shaft, rotatably disposed on the base and being orthogonal to the first shaft, the second shaft provided with a third bevel gear engaged with the second bevel gear, a driving member slidably disposed on the second shaft and operatively engaged or disengaged with the third bevel gear, and an elastic member connected between the driving member and the base, wherein the elastic member assists the driving member in engaging with the third bevel gear, wherein the hinge device comprising a first state and a second state, when the hinge device is in the first state, the first shaft rotates and drives the third bevel gear to rotate without engaging with the driving member, and the second shaft does not rotate along with the third bevel gear; when the hinge device is in the second state, the third bevel gear engages with the driving member, and the first shaft and the second shaft rotate together; and the hinge device switches between the first state and the second state during continuously rotation of the first shaft, wherein the first shaft and the second shaft are configured to be connected to a first portion and a second portion of an electronic device, respectively, and wherein the first shaft rotates to change a first angle between the first portion and the second portion, and the second shaft rotates to change a second angle between a bottom side of the second portion and the central axis of the first axis.

2. The hinge device as claimed in claim 1, wherein the third bevel gear comprises a first connection structure, and the driving member comprises a second connection structure engageable with the first connection structure.

3. The hinge device as claimed in claim 2, wherein the first connection structure comprises a first recess, and the second connection structure comprises a first protrusion corresponding to the first recess, and an inner wall of the first recess is beveled.

4. The hinge device as claimed in claim 3, wherein the second shaft comprises at least one first plane, the driving member comprises at least one second plane corresponding to the at least one first plane, a rotation of the driving member with respect to the second shaft is limited when the at least one first plane in contact with the at least one second plane.

5. The hinge device as claimed in claim 1, wherein the base comprises a first shaft hole provided for configuration of the first shaft, and a second shaft hole provided for configuration of the second shaft, and an axis of the first shaft hole is located on a plane different from that of the second shaft hole.

6. The hinge device as claimed in claim 1, wherein the driving member comprises a resisting block facing the base, and the base comprises a second recess positioned opposite the resisting block, with one side of the second recess forming a second protrusion.

7. The hinge device as claimed in claim 1, wherein the first shaft comprises a first stopping block, and the base comprises a second stopping block corresponding to the first stopping block for limiting a movement range of the first shaft.

8. The hinge device as claimed in claim 7, wherein the third bevel gear comprises a third stopping block, and the second shaft comprises a fourth stopping block corresponding to the third stopping block for limiting a movement range of the second shaft.

9. The hinge device as claimed in claim 1, wherein the first shaft is provided with a first torque assembly, and the second shaft is provided with a second torque assembly, and wherein the first torque assembly and the second torque assembly are configured to determine rotational torques of the first shaft and the second shaft, respectively.

* * * * *